United States Patent [19]
Murray

[11] Patent Number: 6,038,881
[45] Date of Patent: Mar. 21, 2000

[54] ADSORBENT UNIT FOR AIR CONDITIONING SYSTEM

[75] Inventor: Patrick M. Murray, Lockport, N.Y.

[73] Assignee: Multisorb Technologies, Inc., Buffalo, N.Y.

[21] Appl. No.: 09/056,318

[22] Filed: Apr. 7, 1998

[51] Int. Cl.[7] .............................. F25B 43/00; B01D 39/02
[52] U.S. Cl. ................................................. 62/474; 55/515
[58] Field of Search ................................. 62/474; 55/503, 55/515

[56] References Cited

U.S. PATENT DOCUMENTS

| | | | |
|---|---|---|---|
| 4,401,447 | 8/1983 | Huber | 55/387 |
| 4,911,739 | 3/1990 | Cullen et al. | 55/387 |
| 4,994,185 | 2/1991 | Cullen et al. | 210/282 |
| 5,431,986 | 7/1995 | Ortega et al. | 428/198 |
| 5,636,525 | 6/1997 | Riemenschneider | 62/474 |

OTHER PUBLICATIONS

Cerex PBN II Fabric used by another for same purpose as set forth in present patent appln. and described in attached 5 informational sheets of Cerex Advanced Fabrics, L. P.

*Primary Examiner*—William Doerrler
*Attorney, Agent, or Firm*—Joseph P. Gastel

[57] ABSTRACT

A vehicle air conditioning system including a compressor, a condenser coupled to the compressor, an evaporator coupled to the condenser, and an accumulator coupled between the evaporator and the compressor, an adsorbent unit in the accumulator, the adsorbent unit including a casing and adsorbent in the casing, and the casing being fabricated of a fabric which does not produce a thumping noise emanating from the accumulator when the compressor is cycled on.

5 Claims, 2 Drawing Sheets

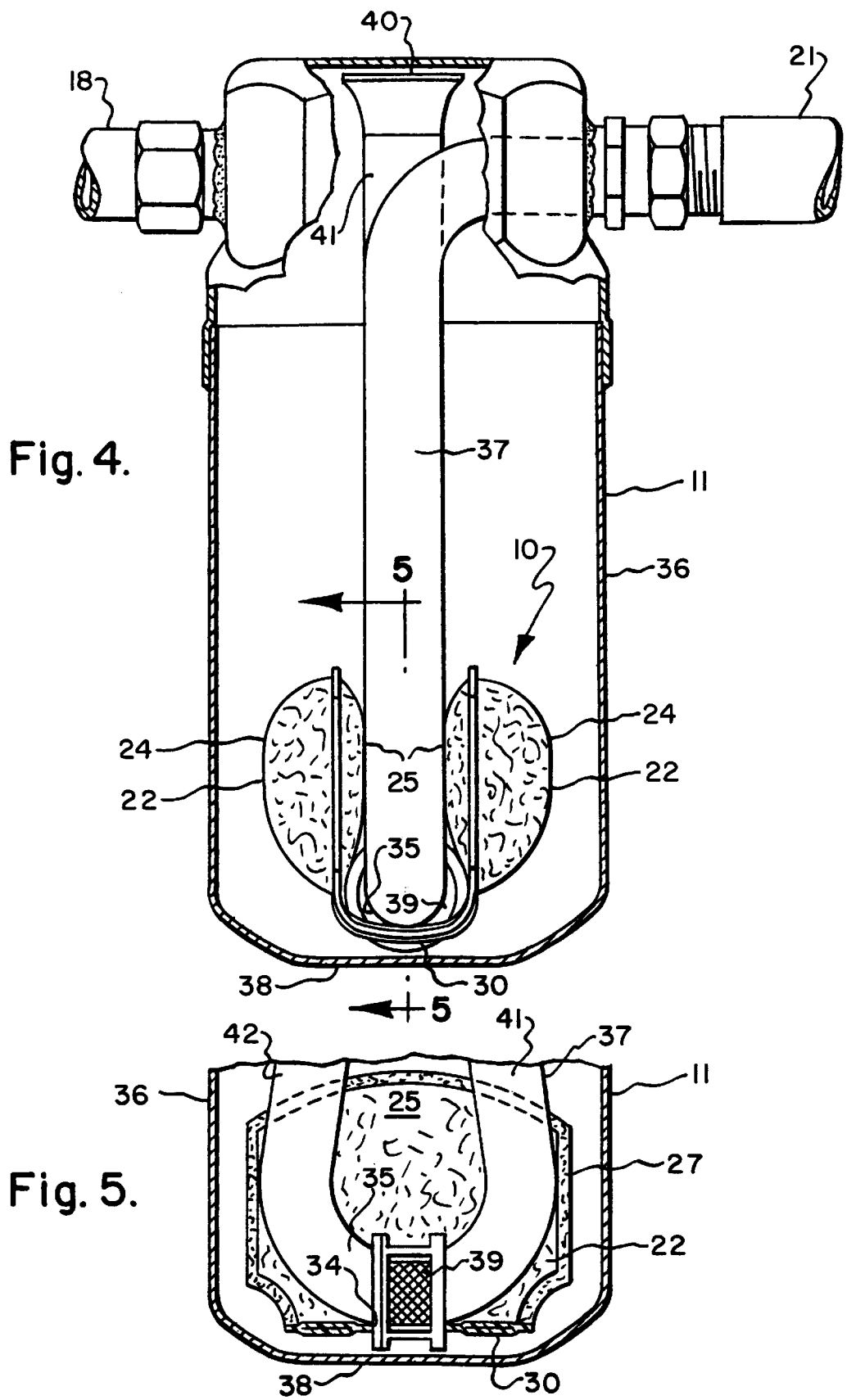

ADSORBENT UNIT FOR AIR CONDITIONING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved vehicle air conditioning system and to an improved adsorbent unit therefor.

By way of background, in existing vehicle air conditioning systems having a compressor, a condenser, an evaporator and an accumulator coupled between the evaporator and the compressor, a problem has arisen in that there is sometimes a thump-like noise when the compressor is cycled on. This thump-like noise is like a noise which would be experienced if someone were to slap the side of the vehicle door. Investigation by an automotive company has revealed that the thumping noise emanates from the accumulator. Further investigation by the automotive company has appeared to indicate that the noise is due to the absorption of refrigerant and oil into the polyester felt which is used for the casing of the adsorbent unit in the accumulator. It is with overcoming the foregoing thumping noise problem that the present invention is concerned.

BRIEF SUMMARY OF THE INVENTION

It is one object of the present invention to provide an improved vehicle air conditioning system having an improved adsorbent unit which does not produce a thumping noise when the compressor of the air conditioning unit is cycled on.

Another object of the present invention is to provide an improved adsorbent unit for a vehicle air conditioning system which will not produce a thumping noise in response to the compressor of the air conditioning system being cycled on. Other objects and attendant advantages of the present invention will readily be perceived hereafter.

The present invention relates to an improved vehicle air conditioning system having a compressor, a condenser coupled to said compressor, an evaporator coupled to said condenser, an accumulator coupled between said evaporator and said compressor, and an adsorbent unit in said accumulator, said adsorbent unit including a casing and adsorbent in said casing, said casing being fabricated of fabric means which does not produce a thumping noise emanating from the accumulator when the compressor is cycled on.

The present invention also relates to an adsorbent unit comprising a casing and adsorbent in said casing, said casing being fabricated of fabric means which does not produce a thumping noise emanating from an accumulator of a vehicle air conditioning system when the compressor of the air conditioning system is cycled on.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 4 is an enlarged partial cross-sectional view taken substantially along line 4—4 of FIG. 1 and showing the accumulator of the air conditioning system into which the improved adsorbent unit is placed; and FIG. 5 is a fragmentary cross sectional view taken substantially along line 5—5 of FIG. 4.

DETAILED DESCRIPTION OF THE INVENTION

Figure 1:
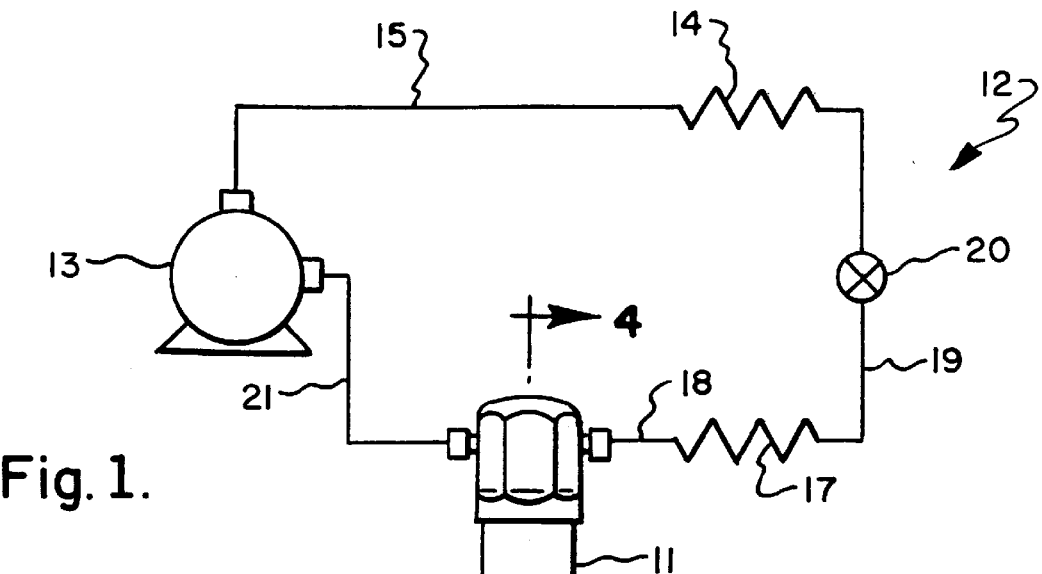
FIG. 1 is a schematic view of the improved vehicle air conditioning system of the present invention.

The improved adsorbent unit 10 is mounted in the accumulator 11 of a vehicle air conditioning system 12 having a compressor 13, the output of which is conducted to a condenser 14 via conduit 15, and the output of the condenser is fed to evaporator 17 via conduit 19 having an expansion valve 20 therein. The output of the evaporator is fed to accumulator 11 via conduit 18, and the output of the accumulator is passed to the intake of compressor 13 via conduit 21. The foregoing air conditioning system is of the type which is well known in the art except for the type of adsorbent unit 10 which is utilized in the accumulator 11.

As explained briefly above, the use of a well known type of adsorbent unit having a polyester felt casing resulted in a thumping noise when the compressor 13 was cycled on. It was believed that the casing absorbed oil and refrigerant and this somehow changed its characteristic so that the thumping noise was experienced.

As a result of the fact that the thumping noise was believed to emanate from the prior polyester felt casing, experimentation was conducted with other types of materials and it was discovered that there were two materials out of approximately forty which were tested which eliminated the thumping noise.

One of the materials which was found to be satisfactory is known under the trademark REEMAY® 2470 which is a spunbonded polyester and is manufactured by Reemay, a member of The Intertech Group, Inc. of Old Hickory, Tenn. The REEMAY® 2470 has a weight of 6 ounces per square yard and is 32 mils thick. It also has a Mullen burst of 82 pounds per square inch and a Frazier air permeability of 160 cubic feet per square foot at 0.5 inches of water. This material can be satisfactorily formed by heat and pressure to provide the cupped sides 24 of containers 22 which include a relatively flat backing 25. Each of the containers 22 contains molecular sieve 23. However, the adsorbent can be any other suitable type well known in the art.

The adsorbent unit 10 includes an outer peripheral edge 27 which is an ultrasonically welded seam. Seam 27 extends around the entire periphery of the adsorbent unit 10. Additionally, each container 22 is delineated by a seam 29, the outer ends of which merge into seam 27. The containers 22 are joined by a yoke 30 having spaced solid portions 31 of a double ply of the REEMAY® fabric, and the solid portions 31 are defined by seams 32 which merge into seams 29 and by portions 28 of seam 27 and by portions 33 of seams 29. An open space 34 is located as shown between solid portions 31 of yoke 30. As is well known, the backings 25 and the rear of solid portions 31 of the yoke are made of a single piece of fabric, and the cupped sides 24 and the front of the solid portions 31 of the yoke are also made of a single piece of fabric, and as is apparent, the two pieces of fabric are joined by the above-described seams. The general configuration of an adsorbent unit having two spaced containers connected by a yoke is well known in the art.

The manner in which the adsorbent unit 10 is mounted in accumulator 11 and its housing 36 is shown in FIGS. 4 and 5. The yoke 30 is placed under the return bend 35 of U-bend tube 37, and the opening 34 of the yoke receives the lower portion of filter 39 mounted at the lower extremity of return bend 35. The yoke 30 is firmly held between the underside of return bend 35 and the bottom wall 38 of the housing 36 in the well-known manner.

The accumulator 11 is conventional and forms no part of the present invention other than its association with the adsorbent unit 10 in the air conditioning system 12. However, by way of background information, the adsorbent unit 10 is wholly or partially submerged in a refrigerant-oil mixture from which it adsorbs moisture. The refrigerant-oil mixture containing both liquid and vapor enters adsorbent unit 11 from conduit 18, and the liquid portion drops to the bottom of the accumulator while the vapor portion stays in the upper portion of the accumulator and enters opening 40 of U-bend tube 37 and passes downwardly into portion 41 of U-bend 37 and thereafter into portion 42 of U-bend tube from which it enters conduit 21 leading to compressor 13.

Figures 2, 3:
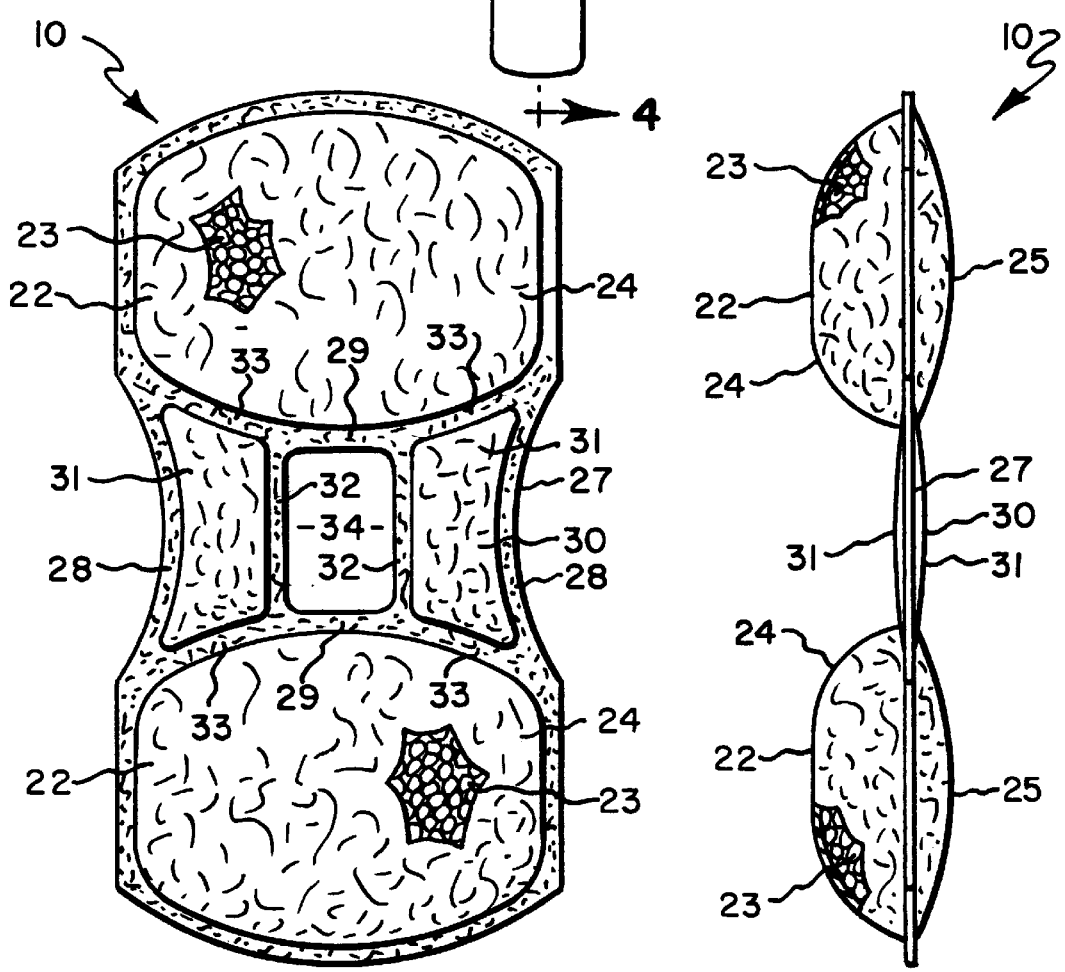
FIG. 2 is a plan view of the improved adsorbent unit of the present invention.
FIG. 3 is a side elevational view of the adsorbent unit of FIG. 2.

Furthermore, while the preferred embodiment of the adsorbent unit is of the type shown in FIGS. 2 and 3, wherein two adsorbent containers each having a cupped side are connected by a yoke for placement under the return bend of a U-bend type of tube, it will be appreciated that the adsorbent unit may be made in other shapes. In this respect, it can be a unit which comprises two pillow-shaped containers connected by a yoke, or it can be a plain pillow-like bag which can be strapped to the U-bend or to any other pipe in the accumulator. Also, a pillow-shaped adsorbent unit can be placed in the bight of the U-bend tube. Additionally, it could be a pillow-shaped unit which is attached in any other suitable way to a tube in an accumulator.

While preferred embodiments of the present invention have been disclosed, it will be appreciated that the present invention is not limited thereto but may be otherwise embodied with the scope of the following claims.

I claim:

1. In a vehicle air conditioning system having a compressor, a condenser coupled to said compressor, an evaporator coupled to said condenser, and an accumulator coupled between said evaporator and said compressor: an adsorbent unit in said accumulator, said adsorbent unit including a casing and adsorbent in said casing, said casing being fabricated of spun bonded polyester fabric means which does not produce a thumping noise emanating from the accumulator when the compressor is cycled on.

2. In a vehicle air conditioning system as set forth in claim 1 wherein said casing comprises first and second adsorbent containers coupled by a yoke.

3. In a vehicle air conditioning system as set forth in claim 2 wherein said accumulator includes a housing, a bottom wall in said housing, a U-bend tube having a return bend adjacent said bottom wall, and wherein said casing is positioned with said yoke located between said return bend and said bottom wall and with said first and second desiccant containers located on opposite sides of said U-bend tube.

4. An adsorbent unit comprising a casing and adsorbent in said casing, said casing being fabricated of spun bonded polyester fabric means which does not produce a thumping noise emanating from an accumulator of a vehicle air conditioning system when the compressor of the air conditioning system is cycled on.

5. An adsorbent unit as set forth in claim 4 wherein said casing comprises first and second adsorbent containers connected by a yoke.

* * * * *